April 29, 1941.  J. Q. KERRINS  2,239,788
VIEW FINDER ATTACHMENT FOR CAMERAS
Filed April 18, 1938

INVENTOR
John Q. Kerrins

Patented Apr. 29, 1941

2,239,788

UNITED STATES PATENT OFFICE 2,239,788

VIEW FINDER ATTACHMENT FOR CAMERAS

John Q. Kerrins, Indianapolis, Ind.

Application April 18, 1938, Serial No. 202,623

4 Claims. (Cl. 88—16)

This invention relates to view finder attachments for cameras and particularly to that class of camera designed for photographing records, deeds, or the like and of that nature wherein many different objects or subjects may be successively photographed on a strip of film so that said film may be wound into reel formation and stored for preserving a record of the objects photographed.

The prime feature of the present invention is the provision of means for properly registering the position of the object to be photographed with respect to the field of the lens on the camera.

A further feature of the invention is the provision of means for moving the position registering means into or out of registration with the lens and for locking the same in its adjusted positions.

A further feature of the invention is the provision of means for preventing the operation of any parts of the camera mechanism when the position registering means is in one position.

Other objects and advantages will be hereinafter pointed out and claimed.

In the accompanying drawing forming a part of this application,

Figure 1:
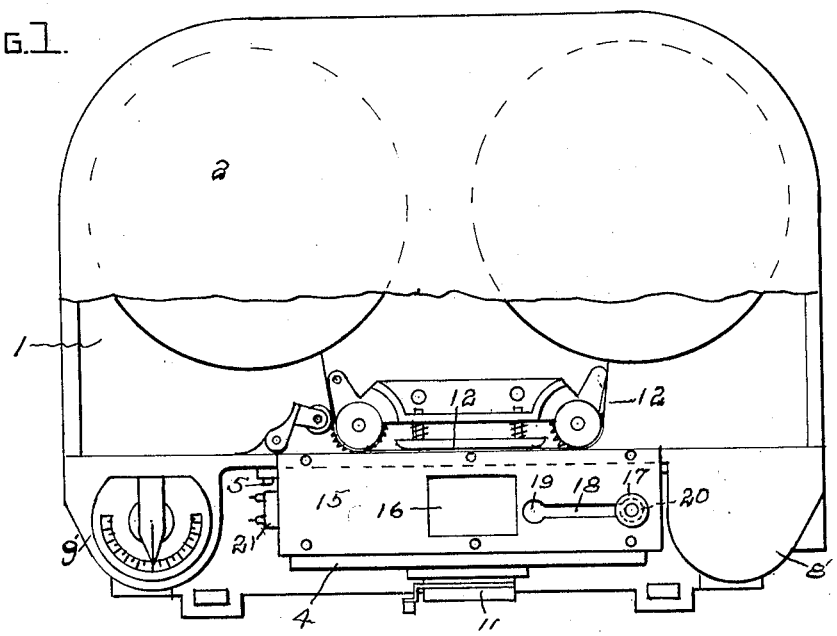
Figure 1 is a front elevational view of the camera with a portion of the front face thereof broken away.
Figure 2:
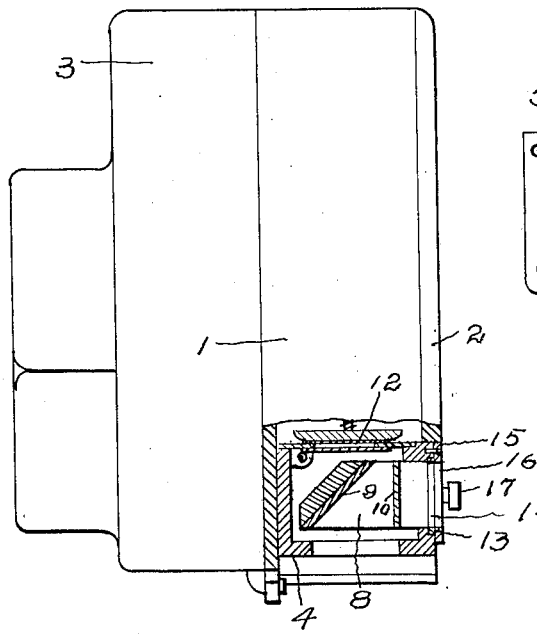
Figure 2 is an end elevational view of the camera with parts broken away and parts in section, and, Figure 3 is a top plan view of the lens carrying box and view finding parts carried thereby.
Figure 3:
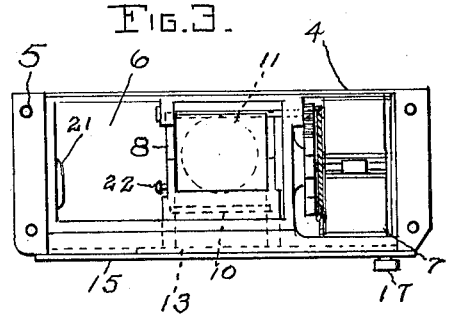

Referring to the drawing, the numeral 1 designates the casing proper for the parts of the camera mechanism, said casing having a hinging front door 2 and a removable rear door 3 and having spaced pockets 8', 9' at opposite edges.

Attached to the lower portion of the casing 1 between the pockets is a box like structure 4, said box being attached to the casing 1 in any suitable manner, as by means of screws 5 or the like.

The box 4 is preferably oblong and preferably divided into compartments 6 and 7, the compartment 6 having a view finder therein comprising a frame 8 open at its lower edge, in which is mounted a mirror 9 and a ground glass plate 10, the mirror being set at such an angle that an object showing through the lens 11 will be reflected onto the ground glass section 10 and through the medium of which the object being photographed may be properly positioned with respect to the film 12.

The forward edge of the frame 8 is attached in any suitable manner to a slidable plate 13, said plate having a window 14 in registration with the plate 10 and the plate 13 is held in position with respect to the box 4 by means of a cover plate 15, secured in any suitable manner over the outer face of the box 4.

The cover plate 15 is also provided with a window 16, with which the window 14 registers when the view finder is positioned directly over the lens 11 so that an object reflected onto the glass section 10 may be fully visible from the exterior of the camera.

The view finder and window 14 are moved into or out of registration with the window 16 by providing a shifting button 17, which projects through an elongated slot 18 in the cover plate 15, the button 17 having its inner end attached to the sliding plate 12.

The slot 18 has enlarged portions 19 and 20 at opposite ends thereof, the button 17 having a portion adapted to enter one or the other of said enlarged portions for locking said plate 13 against movement in either direction until the button is again released from the respective enlarged portion 19 or 20.

At the outer end of the compartment 6 is positioned a cut-out switch 21 with which cooperates a stud 22 on the frame 8, said stud closing said switch when the frame and sliding plate 13 are moved to inoperative position, but when said parts are moved to operative position, or in alinement with the window 16, the circuit through said switch will be broken so that no parts of the camera can operate while the vision finder is being used.

In operation, the object to be photographed is placed below the lens 11 and the view finder moved into registration with the window 16 through the medium of the plate 13 and button 17, this action releasing the stud 22 from the cut-out switch 21 and interrupting the electrical circuit through the camera until the stud 22 is again forced against the switch 21 by again returning the view finder to its inoperative position.

The object below the lens is then properly positioned to register with the film 12, the reflection of the object on the view finder determining the exact position of the object appearing through the lens 11 and reflected onto the ground glass 10 by the mirror 9.

As soon as the exact position of the object has been determined, the view finder and parts associated therewith are returned to their inoperative positions, the stud 22 again contacting the switch 21 and again restoring the electric circuit through the various elements of the camera.

What I claim is:

1. In a camera construction, a casing, a pair of spaced pockets adjacent the lower extremity of said casing, an elongated horizontally disposed box like structure mounted between said pockets and attached thereto, a plate slidably mounted on one face of said box, said plate having a window therethrough, a view finder attached to said plate in registration with said window, a lens attached to the lower face of said box like structure, means for sliding said plate for moving said view finder into or out of registration with said lens, and means for locking said plate against longitudinal movement in either direction.

2. A camera construction having an electrical circuit associated therewith, a casing, a box like structure attached to said casing, a view finder slidably mounted in said box like structure, a cut-out switch in said electrical circuit at one end of said box and means associated with said view finder for cooperation with said cut-out switch for making or breaking the electrical circuit associated with the camera.

3. In a camera construction, a casing, an elongated horizontally disposed box like structure attached thereto, a lens attached to the bottom portion of said box, a view finder in said box, a slidable plate adjacent the outer face of said box and movable endwise in a horizontal plane to which said view finder is attached, a cover plate fixed to the outer face of said box and fitting over said slidable plate, said cover plate having an elongated slot therethrough, a button attached to said slidable plate and projecting through said slot whereby said view finder may be moved into or out of registration with said lens, and means for utilizing said button for locking said sliding plate in either of its extreme adjusted positions.

4. In a camera construction, a casing, a box like structure attached thereto, a lens attached to said box, a view finder slidably mounted in said box and adapted to be moved into or out of registration with said lens, an electrical cut-out switch at one end of said box, and a projecting means carried by said view finder for cooperation with said said cut-out switch for closing a circuit when the view finder is moved in one direction and breaking the circuit through said cut-out switch when the view finder is shifted longitudinally of said box away from said switch.

JOHN Q. KERRINS.